United States Patent
Sonoda (10) Patent No.: US 11,227,148 B2
(45) Date of Patent: Jan. 18, 2022

(54) INFORMATION PROCESSING APPARATUS, INFORMATION PROCESSING METHOD, INFORMATION PROCESSING PROGRAM, AND INFORMATION PROCESSING SYSTEM

(71) Applicant: NEC Corporation, Tokyo (JP)

(72) Inventor: Takashi Sonoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 15/918,055

(22) Filed: Mar. 12, 2018

(65) Prior Publication Data
US 2018/0285632 A1    Oct. 4, 2018

(30) Foreign Application Priority Data
Mar. 30, 2017    (JP) .................. 2017-068440

(51) Int. Cl.
G06K 9/00    (2006.01)
H04N 21/4223    (2011.01)
H04N 7/18    (2006.01)

(52) U.S. Cl.
CPC ..... *G06K 9/00335* (2013.01); *G06K 9/00302* (2013.01); *G06K 9/00671* (2013.01); *G06K 9/00718* (2013.01); *H04N 21/4223* (2013.01); *G06K 2209/27* (2013.01); *H04N 7/181* (2013.01)

(58) Field of Classification Search
CPC ........... G06K 9/00335; G06K 9/00671; G06K 9/00302; G06K 9/00718; G06K 2209/27; H04N 21/4223; H04N 7/181
USPC ....................................... 382/103
See application file for complete search history.

(56) References Cited

U.S. PATENT DOCUMENTS

| | | | | |
|---|---|---|---|---|
| 2014/0052567 | A1* | 2/2014 | Bhardwaj | G06Q 30/0631 705/26.7 |
| 2014/0118225 | A1* | 5/2014 | Jerauld | A61B 5/7278 345/8 |
| 2014/0247343 | A1* | 9/2014 | Chen | G06Q 30/0267 348/135 |

(Continued)

FOREIGN PATENT DOCUMENTS

| | | |
|---|---|---|
| CN | 101789990 A | 7/2010 |
| JP | H11-331827 A | 11/1999 |

(Continued)

OTHER PUBLICATIONS

Japanese Office Action for JP Application No. 2017-068440 dated Sep. 15, 2020 with English Translation.

(Continued)

*Primary Examiner* — Van D Huynh
(74) *Attorney, Agent, or Firm* — Sughrue Mion, PLLC (57) ABSTRACT

A person watching a video shares the realism of the spot. There is provided an information processing apparatus including a video acquirer, an object information collector, a status recognizer, and a display unit. The video acquirer acquires a video from an image capturer that captures a predetermined area. The object information collector collects object information of an object included in the captured video. The status recognizer recognizes a status of the object based on the video and the object information of the object. The display unit displays the recognized status to be identifiable.

10 Claims, 7 Drawing Sheets

(56) References Cited

U.S. PATENT DOCUMENTS

| | | | | |
|---|---|---|---|---|
| 2015/0061824 A1* | 3/2015 | Suzuki | ............... | G06F 3/013 |
| | | | | 340/5.52 |
| 2015/0331711 A1* | 11/2015 | Huang | ............... | G06F 3/0481 |
| | | | | 719/320 |
| 2015/0350536 A1* | 12/2015 | Yajima | ............... | H04N 5/232 |
| | | | | 348/158 |
| 2017/0064363 A1* | 3/2017 | Wexler | ............... | G06K 9/00308 |
| 2017/0161338 A1* | 6/2017 | Kurata | ............... | G06F 17/00 |
| 2018/0184959 A1* | 7/2018 | Takahashi | ............... | G16H 40/67 |

FOREIGN PATENT DOCUMENTS

| | | | |
|---|---|---|---|
| JP | 2007-299255 | A | 11/2007 |
| JP | 2010-210804 | A | 9/2010 |
| JP | 2012-156647 | A | 8/2012 |
| JP | 2013-129914 | A | 7/2013 |
| JP | 2013-239914 | A | 11/2013 |
| WO | 2016/170810 | A1 | 10/2016 |

OTHER PUBLICATIONS

Japanese Office Action for JP Application No. 2017-068440 dated Jan. 26, 2021 with English Translation.

* cited by examiner

| OBJECT ID | OBJECT INFORMATION | | PERIPHERAL ENVIRONMENT INFORMATION | | | STATUS | | ALERT |
|---|---|---|---|---|---|---|---|---|
| | BIOLOGICAL INFORMATION | OPERATION INFORMATION ... | TEMPERATURE | HUMIDITY | ... | FEELING | ... | |
| 0001 | | | | | | | | |
| 0002 | | | | | | | | |
| ... | ... | ... | ... | ... | ... | ... | ... | ... |

INFORMATION PROCESSING APPARATUS, INFORMATION PROCESSING METHOD, INFORMATION PROCESSING PROGRAM, AND INFORMATION PROCESSING SYSTEM

CROSS-REFERENCE TO RELATED APPLICATION

This application is based upon and claims the benefit of priority from Japanese patent application No. 2017-068440, filed on Mar. 30, 2017, the disclosure of which is incorporated herein in its entirety by reference.

BACKGROUND OF THE INVENTION

Field of the Invention

The present invention relates to an information processing apparatus, an information processing method, an information processing program, and an information processing system.

Description of the Related Art

In the above technical field, patent literature 1 discloses a technique of acquiring, based on acquired video information, feeling information about a person included in the video information, acquiring context information based on acquired voice information, and then generating media expression document information based on the acquired feeling information and context information. Patent literature 2 discloses a technique of determining the direction of a sound source position (the direction of a speaker) using a fisheye lens and nondirectional microphone, and generating a video signal by cutting an image (an image of the speaker) in the direction of the sound source position.

[Patent Literature 1] Japanese Patent Laid-Open No. 2007-299255

[Patent Literature 2] Japanese Patent Laid-Open No. 11-331827

SUMMARY OF THE INVENTION

In the techniques described in the above literatures, however, a person watching a video cannot share the realism of the spot.

The present invention enables to provide a technique of solving the above-described problem.

One example aspect of the present invention provides an information processing apparatus comprising:

a video acquirer that acquires a video from an image capturer that captures a predetermined area;

an object information collector that collects object information of an object included in the captured video;

a status recognizer that recognizes a status of the object based on the video and the object information of the object; and a display unit that displays the recognized status to be identifiable.

Another example aspect of the present invention provides an information processing method comprising:

acquiring a video from an image capturer that captures a predetermined area;

collecting object information of an object included in the captured video;

recognizing a status of the object based on the video and the object information of the object; and displaying the recognized status to be identifiable.

Still other example aspect of the present invention provides an information processing program for causing a computer to execute a method, comprising:

acquiring a video from an image capturer that captures a predetermined area;

collecting object information of an object included in the captured video;

recognizing a status of the object based on the video and the object information of the object; and displaying the recognized status to be identifiable.

Still other example aspect of the present invention provides an information processing system comprising:

an image capturer that captures a video of a predetermined area;

an object information collector that collects object information of an object included in the video of the predetermined area captured by the image capturer;

a status recognizer that recognizes a status of the object based on the video and the object information of the object; and a display unit that displays the recognized status to be identifiable.

According to the present invention, a person watching a video can share the realism of the spot.

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus that recognizes and displays the status of an object included in a captured video.

Figure 1:
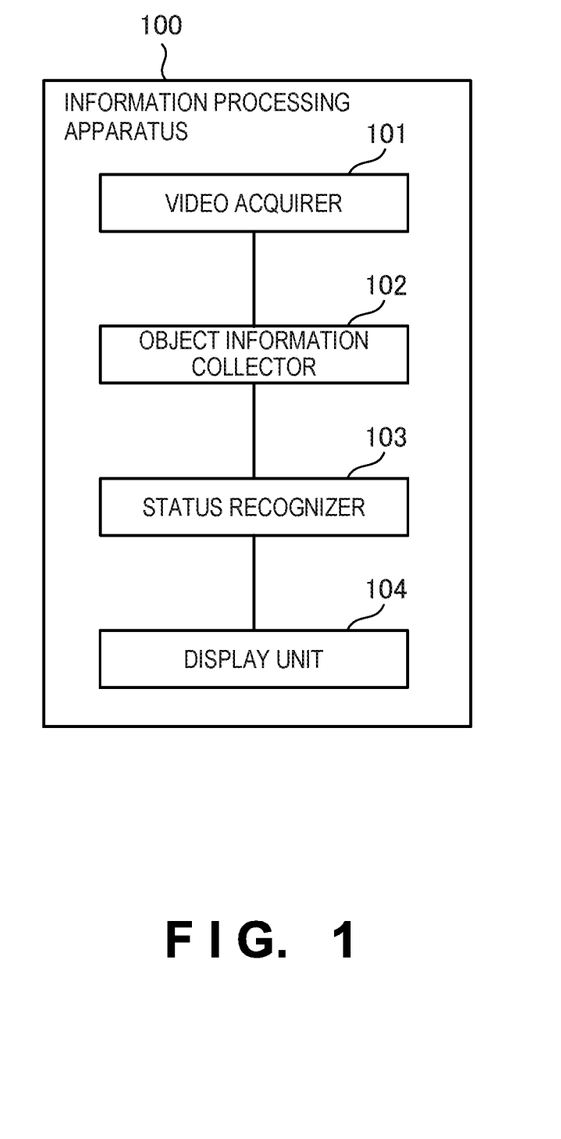
FIG. 1 is a block diagram showing the arrangement of an information processing apparatus according to the first example embodiment of the present invention.

As shown in FIG. 1, the information processing apparatus 100 includes a video acquirer 101, an object information collector 102, a status recognizer 103, and a display unit 104.

The video acquirer 101 acquires a video from an image capturer that captures a predetermined area. The object information collector 102 collects object information of an object included in the captured video. The status recognizer 103 recognizes the status of the object based on the video and object information of the object. The display unit 104 displays the recognized status to be identifiable.

According to this example embodiment, a person watching a video can share the realism of the spot.

Second Example Embodiment

Figure 2:
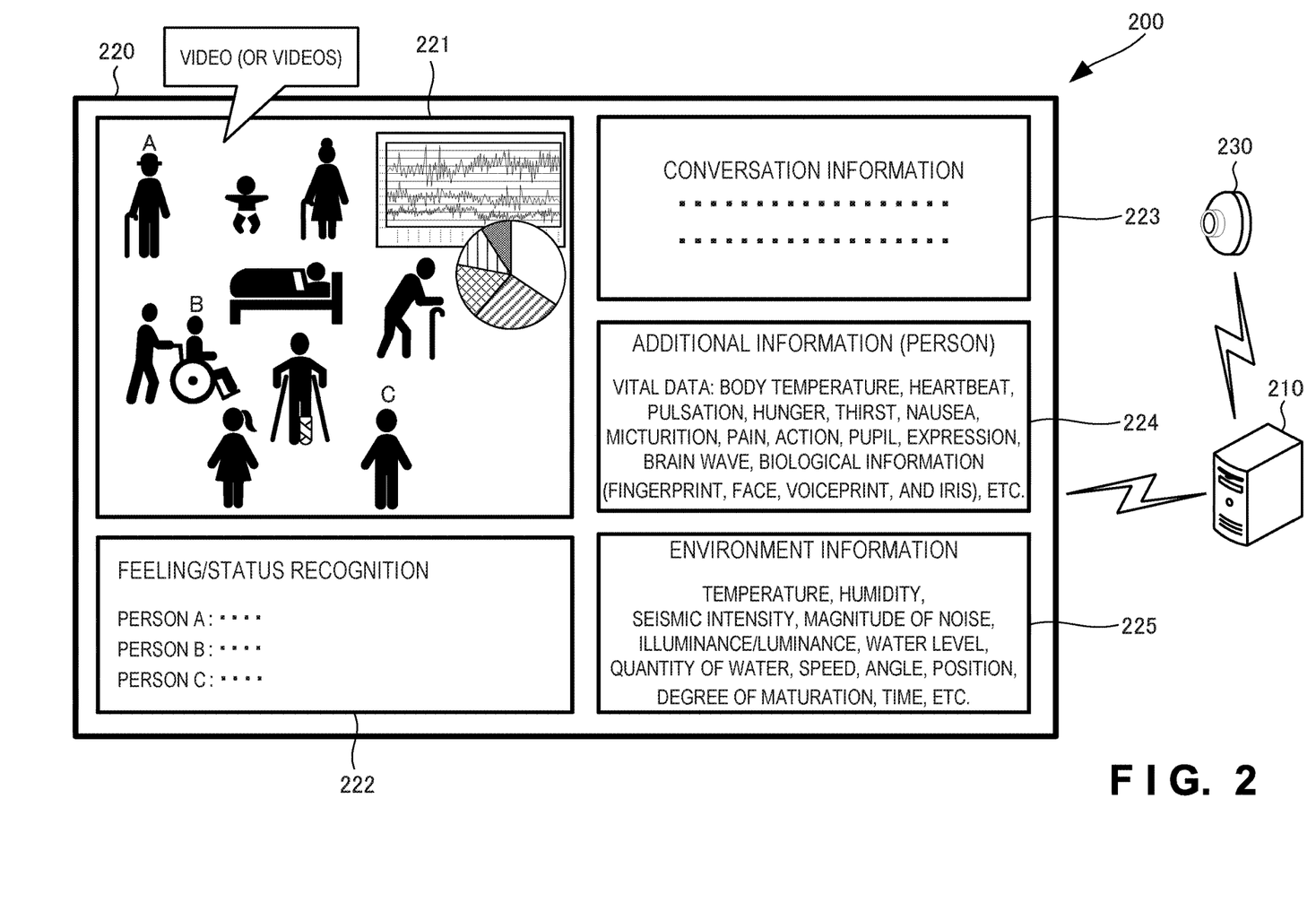
FIG. 2 is a view for explaining the configuration of an information processing system according to the second example embodiment of the present invention.

An information processing system according to the second example embodiment of the present invention will be described with reference to FIGS. 2 to 6. FIG. 2 is a view for explaining an example of the configuration of the information processing system according to this example embodiment.

The information processing system 200 includes an information processing apparatus 210, a display unit 220, and a camera 230. The information processing system 200 also includes various sensors such as a voice information acquisition sensor (microphone), a vital data acquisition sensor, and an environment information acquisition sensor (none are shown).

The information processing system 200 is a system that allows a person watching a video to share the realism of the spot by recognizing the status of an object included in a video and displaying the recognized status to be identifiable in a meeting, concert, hospital, prison, ordinary home, or the like where many people gather. The information processing system is also a system that expresses the feeling of a person captured by the camera, and expresses feelings more than delight, anger, sorrow, and pleasure. The information processing system 200 is a system applicable to an event site where many people gather, home care with insufficient facilities instead of a hospital where facilities are provided, a prison where it is necessary to control many prisoners, a demonstration, or the like.

The information processing apparatus 210 acquires a video of a predetermined area captured by the camera 230, and acquires object information of an object included in the acquired video. The object information includes, for example, voice information, vital data, operation information, and expression information. The voice information includes, for example, the voice, voiceprint, and utterance contents of the object. The vital data includes, for example, a body temperature, a heartbeat, a pulsation, hunger, a thirst, nausea, micturition, a pain, a pupil, a brain wave, a fingerprint, a respiration rate, a sweat rate, and an iris. The operation information includes, for example, information about the operation of the object, and indicates the action of the object. The expression information includes the expression, facial motion, and eye movement of the object.

The information processing apparatus 210 acquires information of the peripheral environment of the object. The peripheral environment information includes, for example, a temperature, a humidity, a seismic intensity, the magnitude of noise, an illuminance, a luminance, a water level, the quantity of water, a speed, an angle, a position, the degree of maturation, and time in a place where the object exists.

The information processing apparatus 210 recognizes the status of the object based on the acquired video and object information. The status of the object includes, for example, the feeling, mind, and physical condition of the object.

The display unit 220 displays, in a display region 221, the vital data and the like of the object in the form of a graph or the like together with the video captured by the camera 230. The graph or the like may be superimposed and displayed (for example, AR (Augmented Reality)-displayed) on the video captured by the camera 230 so that a person watching the video of the camera 230 visually perceives the data and the like.

The display unit 220 displays the status and feeling of the object in a display region 222. The feeling of the object and the like are displayed using text or a pictorial symbol. However, a method of displaying the feeling of the object is not limited to this.

Furthermore, the display unit 220 displays conversation contents or utterance contents as conversation information of the object in a display region 223. The conversation information is displayed in, for example, text. However, the size and font of text may be different for each speaker. The size of text may be changed in accordance with the loudness of the voice. Furthermore, text may be colored for each speaker. A method of displaying text is not limited to them.

The display unit 220 displays the peripheral environment information in a display region 225. The peripheral environment information includes a temperature, a humidity, a seismic intensity, the magnitude of noise, an illuminance, a luminance, a water level, the quantity of water, a speed, an angle, a position, the degree of maturation, and time, and these pieces of information are displayed. Note that the various kinds of information displayed on the display unit 220 can be turned on or off, as needed.

For example, when the status of the object included in the video captured by the camera 230 changes, the information processing system 200 may notify, of an alert, the person watching the video or the like.

Figure 3:
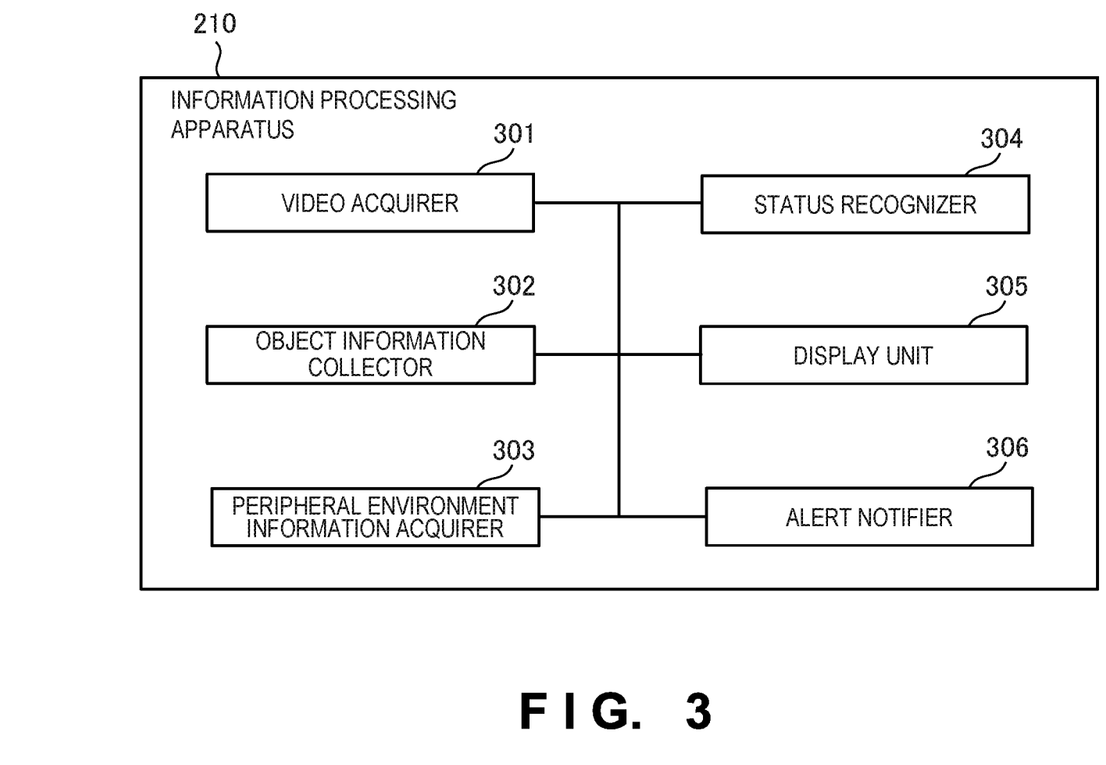
FIG. 3 is a block diagram showing the arrangement of an information processing apparatus included in the information processing system according to the second example embodiment of the present invention.

FIG. 3 is a block diagram showing the arrangement of the information processing apparatus included in the information processing system according to this example embodiment. The information processing apparatus 210 includes a video acquirer 301, an object information collector 302, a peripheral environment information acquirer 303, a status recognizer 304, a display unit 305, and an alert notifier 306.

The video acquirer 301 acquires a video of a predetermined area captured by an image capturing device such as the camera 230. The camera 230 is represented by, for example, a security camera or surveillance camera attached to a facility, but is not limited to them.

The object information collector 302 collects object information of an object included in the video captured by the camera 230. The object information collector 302 extracts an object such as a person from the video acquired by the video acquirer 301, and collects object information of the extracted object. The object information includes, for example, voice information, biological information, operation information, and expression information of the object. The voice information includes the voice, voice volume, voiceprint, utterance contents, and conversation contents of the object. The voice information is acquired from a microphone attached to the camera 230, a microphone attached to a facility, or the microphone of a mobile terminal such as a smartphone carried by the object.

The biological information is so-called vital data, and includes, for example, a body temperature, a heartbeat, a pulsation, hunger, a thirst, nausea, micturition, a pain, a respiration rate, a brain wave, and a sweat rate. The biological information is acquired from, for example, a medical device or a watch-type, spectacle-type, or underwear-type wearable device worn by the object. However, a biological information acquisition method is not limited to this.

The operation information is information about the movement of the object, and information indicating how the object moves. The operation information is, for example, information indicating whether the object is walking, sitting, or running, stays still, or is moving an arm, but is not limited to this.

Furthermore, the expression information is information about the expression or physiognomy of the object. The expression information is, for example, information indicating whether the expression of the object is a smile expression or angry expression, but is not limited to this.

In addition, the stature, clothing, sex, age, height, hairstyle, and the presence/absence of glasses of the object may be included as the object information.

The peripheral environment information acquirer 303 acquires information about the peripheral environment of the object included in the video captured by the camera 230. The peripheral environment information includes, for example, a temperature, a humidity, a seismic intensity, the magnitude of noise, an illuminance, a luminance, a water level, the quantity of water, a speed, an angle, a position, the degree of maturation, and time. The peripheral environment information is acquired from, for example, a mobile terminal such as a smartphone or smartwatch carried by the object, a sensor arranged in a facility where the object exists, another sensor, an infrared camera, a thermography, or the like. However, an acquisition method is not limited to them.

The status recognizer 304 recognizes the status of the object based on the video and object information of the object, change information of the object information, and the like. For example, based on the values of the vital data such as a body temperature and heartbeat, and change information of the vital data, the status recognizer 304 recognizes the feeling, the mind, and the like of the object.

Furthermore, the status recognizer 304 recognizes the status of the object based on pieces of information from sensors that can measure parameters about the environment such as the temperature, the humidity, the seismic intensity, the magnitude of noise, the illuminance, and the luminance, instead of the vital data. The feeling and mind of the object are considered to change in accordance with these pieces of information. In consideration of this, the status recognizer 304 recognizes the status of the object. In addition, the status recognizer 304 recognizes the status of the object based on changes in expression, operation, sweat rate, voice volume, environment information, and the like of the object.

The display unit 305 displays the recognized status to be identifiable. For example, the display unit 305 represents the recognized status, feeling, and mind in a form including text. For example, if the object is angry, the display unit 305 represents the status in a form in which it is possible to recognize that the object is angry. If the object has a calm mind, the display unit 305 represents the status in a form in which it is possible to recognize that the object has a calm mind. The display unit 305 may superimpose and display, for example, the status, utterance contents, vital data, peripheral environment information, and the like of the object on the video captured by the camera 230.

The alert notifier 306 sends an alert notification based on the recognized status. For example, the alert notifier 306 notifies, of an alert, a person watching the display unit 220 or the like. If, for example, a change indicating an abnormality appears in the vital data of the person as the object in the video, the alert notifier 306 may send an alert notification indicating it. If the feeling of the object changes, for example, if the object having a calm mind gets excited suddenly or the consciousness of the object sitting on a chair deteriorates suddenly, the alert notifier 306 may send an alert notification indicating it.

The alert is generated by, for example, flickering a screen, displaying an icon representing contents of the alert or the like, displaying text representing contents of the alert, generating an alert sound, vibrating the display unit 220, or flickering a lamp.

Note that what will happen next may be predicted based on a change in status, feeling, environment, or the like of the object, a person watching the video may be notified of a preventive measure or countermeasure to take it.

Figure 4:
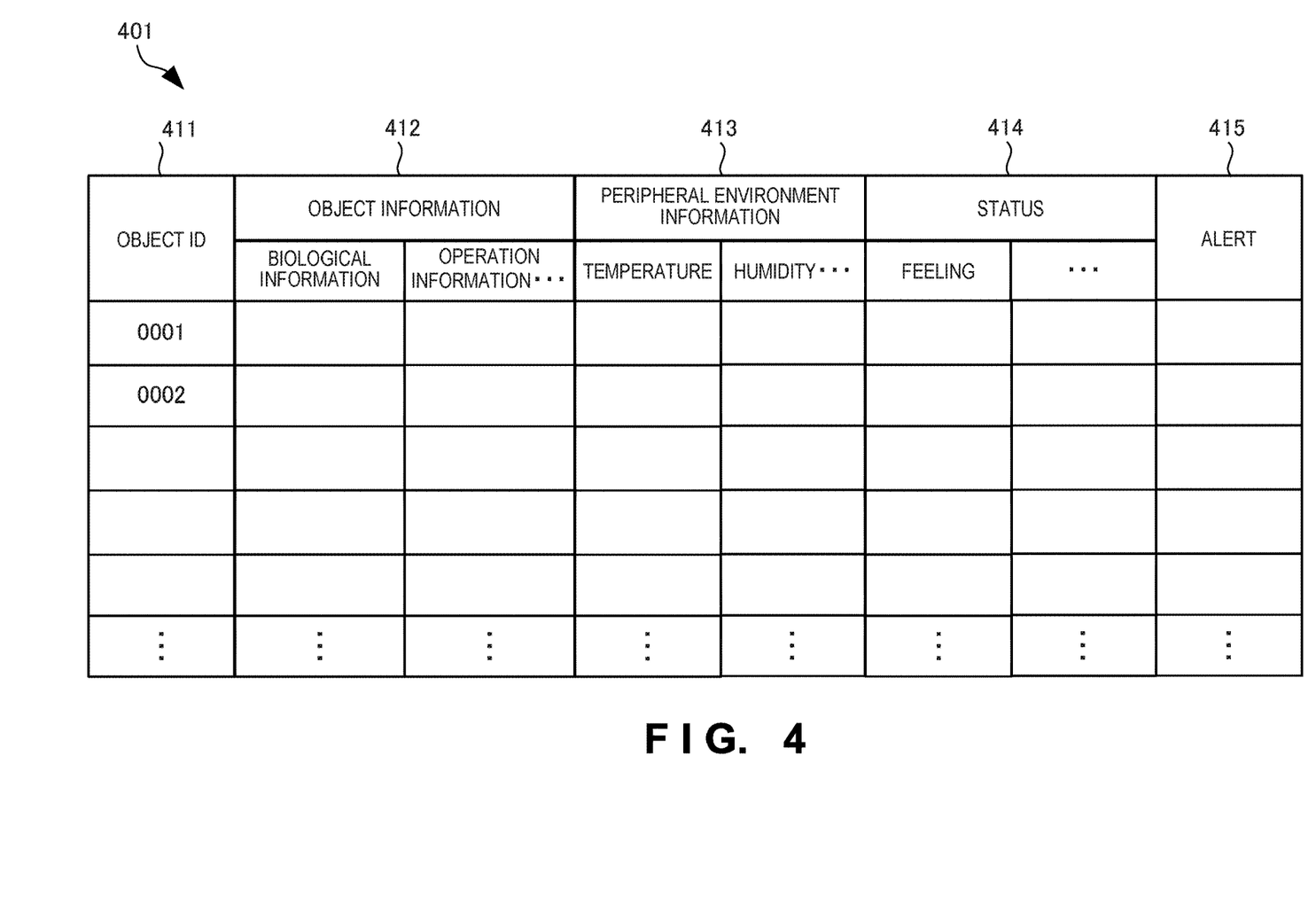
FIG. 4 is a table showing an example of a status table held by the information processing apparatus included in the information processing system according to the second example embodiment of the present invention.

FIG. 4 is a table showing an example of a status table held by the information processing apparatus included in the information processing system according to this example embodiment. A status table 401 stores object information 412, peripheral environment information 413, a status 414, and an alert 415 in association with an object ID (IDentifier) 411.

The object ID 411 is an identifier for identifying an object in the video of the predetermined area captured by the camera 230. The object information 412 is information about the object, and includes, for example, the biological information, operation information, voice information, and expression information of the object. The peripheral environment information 413 is information of the peripheral environment of the object, and includes, for example, a temperature, a humidity, a seismic intensity, the magnitude of noise, an illuminance, and a luminance. The status 414 represents the status of the object, and indicates, for example, the feeling and mind of the object. The alert 415 indicates contents of an alert to be generated.

Figure 5:
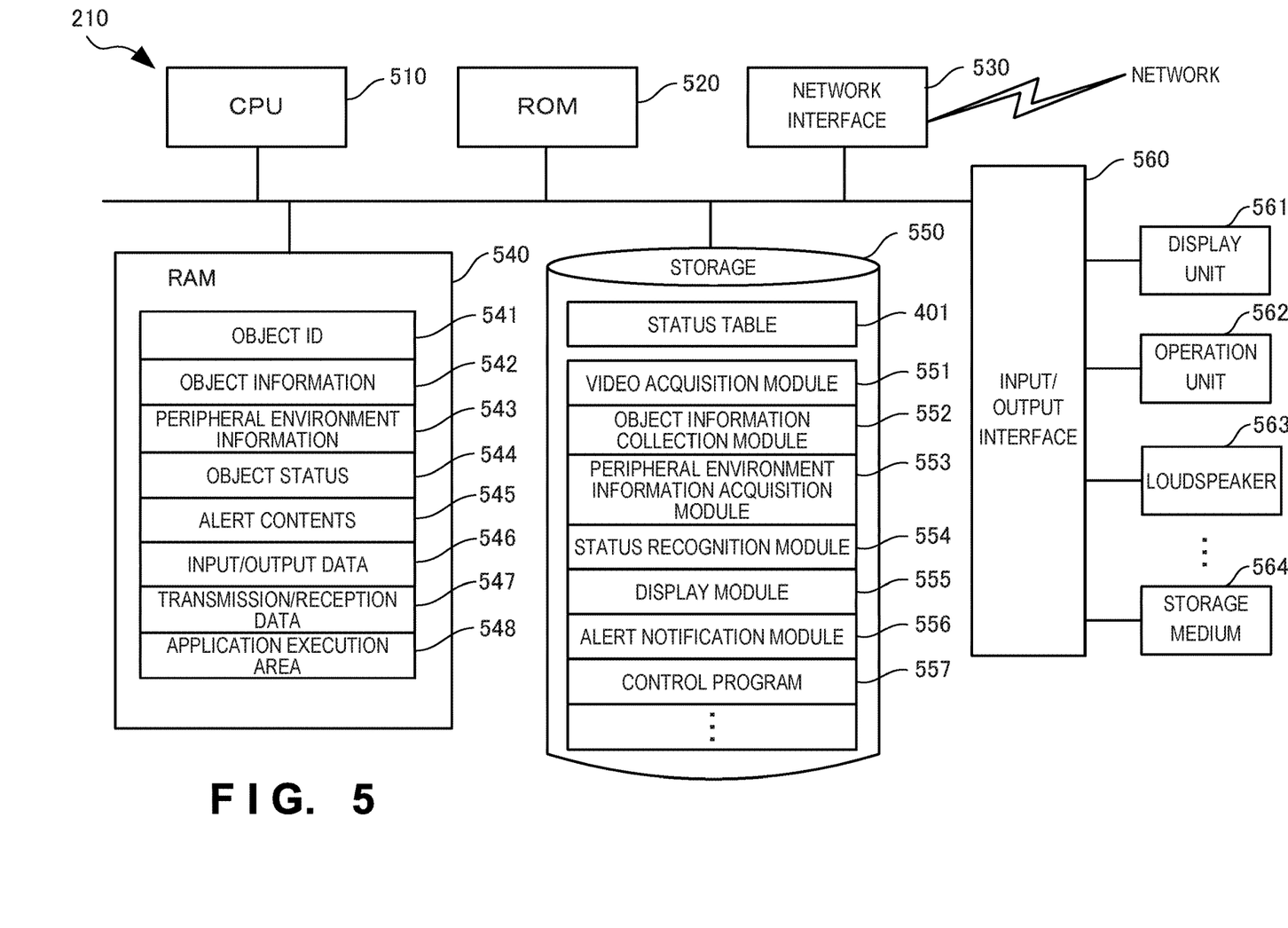
FIG. 5 is a view showing the hardware arrangement of the information processing apparatus included in the information processing system according to the second example embodiment of the present invention.

FIG. 5 is a block diagram for explaining the hardware arrangement of the information processing apparatus 210 included in the information processing system according to this example embodiment. A CPU (Central Processing Unit) 510 is an arithmetic control processor, and implements the functional components of the information processing apparatus 210 shown in FIG. 3 by executing a program. The CPU 510 may include a plurality of processors to parallelly execute different programs, modules, tasks, or threads. A ROM (Read Only Memory) 520 stores permanent data such as initial data and a program, and other programs. A network interface 530 communicates with another apparatus or the like via a network. Note that the number of CPUs 510 is not limited to one, and a plurality of CPUs or a GPU (Graphics Processing Unit) for image processing may be included. The network interface 530 desirably includes a CPU independent of the CPU 510, and writes or reads transmission/reception data in or from the area of a RAM (Random Access Memory) 540. It is desirable to provide a DMAC (Direct Memory Access Controller) (not shown) for transferring data between the RAM 540 and a storage 550. Furthermore, an input/output interface 560 desirably includes a CPU independent of the CPU 510, and writes or reads input/output data in or from the area of the RAM 540. Therefore, the CPU 510 processes the data by recognizing that the data has been received by or transferred to the RAM 540. Furthermore, the CPU 510 prepares processing results in the RAM 540, and delegates succeeding transmission or transfer to the network interface 530, DMAC, or input/output interface 560.

The RAM 540 is a random access memory used as a temporary storage work area by the CPU 510. An area to store data necessary for implementation of the example embodiment is allocated to the RAM 540. An object ID 541 is data for identifying an object in the video captured by the camera 230. Object information 542 is information about the object. Peripheral environment information 543 is information about the peripheral environment of the object. An object status 544 is data about the status of the object. Alert contents 545 are data about an alert to be generated. These data and pieces of information are deployed from, for example, the status table 401.

Input/output data 546 is data input/output via the input/output interface 560. Transmission/reception data 547 is data transmitted/received via the network interface 530. The RAM 540 includes an application execution area 548 used to execute various application modules.

The storage 550 stores a database, various parameters, or the following data or programs necessary for implementation of the example embodiment. The storage 550 stores the status table 401. The status table 401 is a table, shown in FIG. 4, for managing the relationship among the object ID 411, the status 414, and the like.

The storage 550 also stores a video acquisition module 551, an object information collection module 552, a peripheral environment information acquisition module 553, a status recognition module 554, a display module 555, and an alert notification module 556.

The video acquisition module 551 is a module that acquires the video of the predetermined area captured by the camera 230. The object information collection module 552 is a module that collects information of an object in the video captured by the camera 230. The peripheral environment information acquisition module 553 is a module that acquires information of the peripheral environment of the object. The status recognition module 554 recognizes the status of the object based on the video, object information, and peripheral environment information of the object. The display module 555 is a module that displays the recognized status of the object to be identifiable. The alert notification module 556 is a module that sends an alert notification based on the recognized status. These modules 551 to 556 are loaded into the application execution area 548 of the RAM 540 by the CPU 510, and executed. A control program 557 is a program that controls the overall information processing apparatus 210.

The input/output interface 560 interfaces input/output data with an input/output device. The input/output interface 560 is connected to a display unit 561 and an operation unit 562. The input/output interface 560 may also be connected to a storage medium 564. Furthermore, a loudspeaker 563 serving as a voice output unit, a microphone (not shown) serving as a voice input unit, or a GPS position determiner may be connected. Note that programs and data that are associated with the general-purpose functions of the information processing apparatus 210 and other feasible functions are not shown in the RAM 540 or the storage 550 of FIG. 5.

Figure 6:
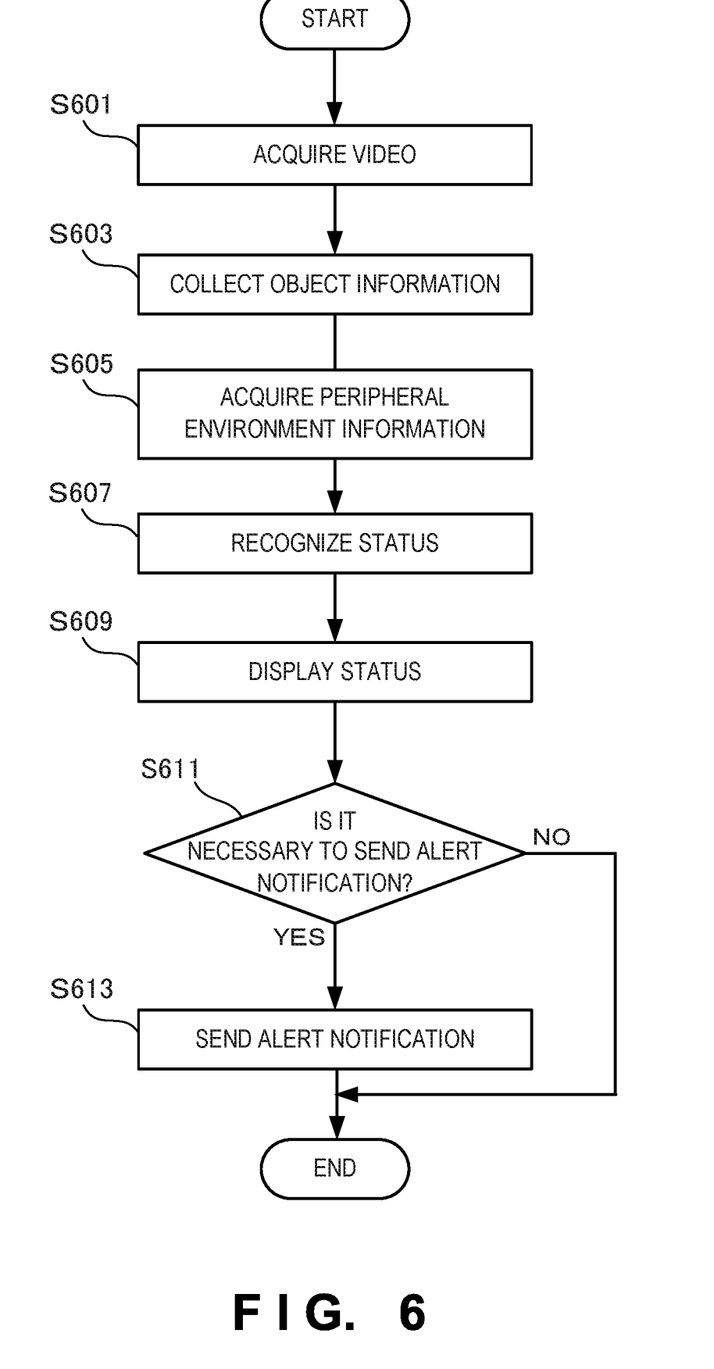
FIG. 6 is a flowchart for explaining the processing procedure of the information processing apparatus included in the information processing system according to the second example embodiment of the present invention.

FIG. 6 is a flowchart for explaining the processing procedure of the information processing apparatus 210 according to the example embodiment. This flowchart is executed by the CPU 510 of FIG. 5 using the RAM 540, thereby implementing the functional components of the information processing apparatus 210 shown in FIG. 3.

In step S601, the information processing apparatus 210 acquires the video of the predetermined area captured by the camera 230. In step S603, the information processing apparatus 210 collects object information of an object in the captured video. In step S605, the information processing apparatus 210 acquires peripheral environment information as information of the peripheral environment of the object. In step S607, the information processing apparatus 210 recognizes the status of the object based on the video, object information, and peripheral environment information of the object.

In step S609, the information processing apparatus 210 displays the recognized status. In step S611, the information processing apparatus 210 determines, based on the recognized information, whether it is necessary to send an alert notification. If it is not necessary to send an alert notification (NO in step S611), the information processing apparatus 210 ends the process; otherwise (YES in step S611), the information processing apparatus 210 advances to step S613. In step S613, the information processing apparatus 210 sends an alert notification by a predetermined notification method.

According to this example embodiment, a person watching the video can share the realism and status of the spot. The person watching the video can also grasp and share the status of the object. Even a person who watches the video from the middle can share the realism of the spot. In addition, since the person watching the video is notified of an alert, he/she can cope with a situation on the spot in accordance with the alert.

Third Example Embodiment

Figure 7:
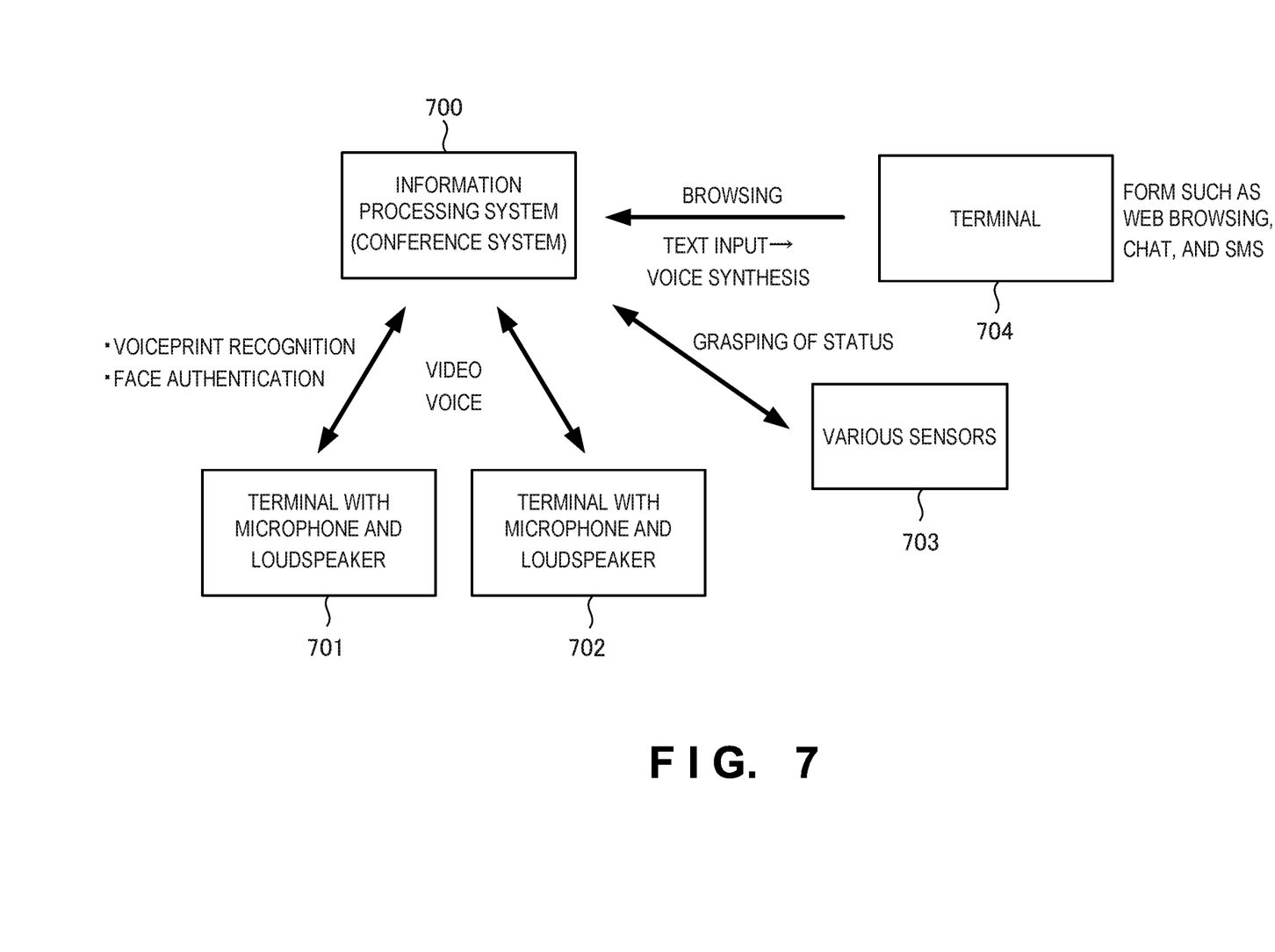
FIG. 7 is a view for explaining the configuration of an information processing system according to the third example embodiment of the present invention.

An information processing system according to the third example embodiment of the present invention will be described with reference to FIG. 7. FIG. 7 is a view for explaining the configuration of the information processing system according to this example embodiment. The information processing system according to this example embodiment is different from that according to the above-described second example embodiment in that the information processing system is applied to a conference system. The remaining components and operations are the same as those in the second example embodiment. Hence, the same reference numerals denote the same components and operations, and a detailed description thereof will be omitted.

An information processing system (conference system) 700 acquires voice information such as the utterance or conversation of a participant in a conference from each of terminals 701 and 702 with microphones and loudspeakers. The information processing system 700 acquires a video during the conference, the vital data of conference participants, environment data in a conference room, and the like from various sensors 703.

The information processing system 700 specifies a speaker by voiceprint recognition or the like based on the voice information from each of the microphones of the terminals 701 and 702 with the microphones and loudspeakers. Alternatively, the information processing system 700 specifies a speaker by face recognition or the like based on information of a video from a camera. The information processing system 700 may specify a speaker by combining voiceprint recognition and face recognition.

If, for example, the conference participants share the one terminal 701 with the microphone and loudspeaker, it is possible to specify a speaker at higher accuracy by combining videos of a 360-degree camera and a camera with a fisheye lens as the various sensors 703 and performing comprehensive determination. For example, it is possible to specify the speaker of each utterance or conversation at higher accuracy by comprehensively determining a plurality of pieces of information, for example, by performing authentication of the movements of the mouths of the conference participants, face authentication, specification of the direction of the speaker, and the like based on the video of the camera, and then determining a voiceprint based on a voice collected by the microphone.

The information processing system 700 converts a set of the specified speaker and remark contents (utterance contents) into text based on the pieces of information from the terminals 701 and 702 with the microphones and loudspeakers and various sensors 703. Note that an application installed in a terminal 704 may perform conversion into text. If the application installed in the terminal 704 performs conversion into text, voice information before passing through the network can be input, thereby improving the accuracy of conversion into text.

The information processing system 700 performs conversation analysis (utterance analysis) to additionally express additional information (strong, weak, laugh, anger, sadness, or the like) of the conference in text so that a scene during the conference comes to mind. This allows a person attending the conference without any microphone or loudspeaker to share the contents and realism of the conference.

The information processing system 700 adds the various sensors 703, for example, a temperature, a humidity, noise, a queer voice, vital information, and a change or movement of a measurement device or the like, instead of the microphones and loudspeakers, thereby allowing a person who is not there to share the realism in a place other than the conference room.

In an environment including no microphone or loudspeaker, contents input in text by a person attending the conference may be output to the loudspeaker of each participant by voice synthesis using the terminal 704.

For example, not in a hospital where facilities are provided but in an environment such as home care with insufficient facilities as a place other than the conference room, a person who is not there can share the realism.

In addition, since the information processing system 700 can specify a speaker, it is possible to record contents in text as the minutes of the conference. Furthermore, the information processing system 700 can actively follow the conference by transmitting the recorded minutes to the conference participants by email or the like.

Since the utterance contents and the like are converted into text, the contents in text can be interpreted in real time or later. This can create the minutes in a language desired by a person who wants to obtain the minutes.

Furthermore, the information processing system 700 can automatically take action in accordance with the utterance contents by analyzing the utterance contents in text. The information processing system 700 can automatically order a product, perform various adjustments, execute a search, reply an answer, generate an alert, perform transmission, or stop. The information processing system 700 can notify a person in charge of an alert indicating that "it is necessary to carry a towel to room 302 immediately".

According to this example embodiment, even a person who is not attending the conference can share the realism of the conference. Even if a person joins the conference from the middle, he/she can share the realism and the like of the conference. Not in a hospital where facilities are provided but in an environment such as home care with insufficient facilities, a person watching a video can share the status of the object and the realism of the spot. Furthermore, in a situation in which many people gather, such as a concert, prison, or demonstration, a person who is not there or a person who is watching a video can share the status of participants and the realism of the spot.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.
(Supplementary Note 1)
There is provided an information processing apparatus comprising:
a video acquirer that acquires a video from an image capturer that captures a predetermined area;
an object information collector that collects object information of an object included in the captured video;
a status recognizer that recognizes a status of the object based on the video and the object information of the object; and
a display unit that displays the recognized status to be identifiable.
(Supplementary Note 2)
There is provided the apparatus according to supplementary note 1, further comprising:
a peripheral environment information acquirer that acquires peripheral environment information as information of a peripheral environment of the object,
wherein the status recognizer further recognizes the status of the object based on the peripheral environment information.
(Supplementary Note 3)
There is provided the apparatus according to supplementary note 2, wherein the peripheral environment information includes at least one of a temperature, a humidity, a seismic intensity, a magnitude of noise, an illuminance, and a luminance.
(Supplementary Note 4)
There is provided the apparatus according to any one of supplementary notes 1 to 3, further comprising an alert notifier that sends an alert notification based on the recognized status.

(Supplementary Note 5)

There is provided the apparatus according to any one of supplementary notes 1 to 4, wherein the object information includes at least one of voice information, biological information, operation information, and expression information of the object.

(Supplementary Note 6)

There is provided the apparatus according to supplementary note 5, wherein the biological information includes at least one of a body temperature, a heartbeat, a pulsation, hunger, a thirst, nausea, micturition, a pain, a respiration rate, a brain wave, and a sweat rate.

(Supplementary Note 7)

There is provided the apparatus according to any one of supplementary notes 1 to 6, wherein the status includes at least a feeling of the object.

(Supplementary Note 8)

There is provided the apparatus according to any one of supplementary notes 1 to 7, wherein the display unit displays text representing the status.

(Supplementary Note 9)

There is provided an information processing method comprising:

acquiring a video from an image capturer that captures a predetermined area;

collecting object information of an object included in the captured video;

recognizing a status of the object based on the video and the object information of the object; and displaying the recognized status to be identifiable.

(Supplementary Note 10)

There is provided an information processing program for causing a computer to execute a method, comprising:

acquiring a video from an image capturer that captures a predetermined area;

collecting object information of an object included in the captured video;

recognizing a status of the object based on the video and the object information of the object; and displaying the recognized status to be identifiable.

(Supplementary Note 11)

There is provided an information processing system comprising:

an image capturer that captures a video of a predetermined area;

an object information collector that collects object information of an object included in the video of the predetermined area captured by the image capturer;

a status recognizer that recognizes a status of the object based on the video and the object information of the object; and a display unit that displays the recognized status to be identifiable.

What is claimed is:

1. An information processing apparatus comprising:
    a video acquirer that acquires a captured video from an image capturer that captures a predetermined area and at least one person;
    an information collector that collects biological information of the captured person included in the captured video from a wearable device worn by the captured person and collects peripheral environment information from a mobile terminal carried by the captured person;
    a first status recognizer that recognizes a personal status of the captured person, based on the captured video and the biological information of the captured person;
    a second status recognizer that recognizes an environmental status of the predetermined area, based on the personal status of the captured person and the peripheral environment information includes at least one of a temperature, a humidity, a seismic intensity, a magnitude of noise, an illuminance, and a luminance; and
    a display unit that displays the recognized personal status and the recognized environmental status.

2. The apparatus according to claim 1, further comprising:
    a peripheral environment information acquirer that acquires peripheral environment information as information of a peripheral environment of the captured person,
    wherein said status recognizer further recognizes the personal status of the person based on the peripheral environment information.

3. The apparatus according to claim 1, wherein the personal status includes at least a feeling of the captured person.

4. The apparatus according to claim 1, wherein said display unit displays text representing the personal status.

5. An information processing method comprising:
    acquiring a captured video from an image capturer that captures a predetermined area and at least one person;
    collecting biological information of the captured person included in the captured video from a wearable device worn by the captured person and collects peripheral environment information from a mobile terminal carried by the captured person;
    recognizing a personal status of the captured person based on the captured video and the biological information of the captured person;
    recognizing an environmental status of the predetermined area, based on the personal status of the captured person and the peripheral environment information includes at least one of a temperature, a humidity, a seismic intensity, a magnitude of noise, an illuminance, and a luminance; and
    displaying the recognized personal status and the recognized environmental status.

6. The information processing method according to claim 5, further comprising:
    acquiring peripheral environment information as information of a peripheral environment of the captured person,
    recognizing the personal status of the captured person based on the peripheral environment information.

7. The information processing method according to claim 5, wherein the personal status includes at least a feeling of the captured person.

8. The information processing method according to claim 5, further comprising displaying text representing the personal status.

9. A non-transitory computer readable medium storing an information processing program for causing a computer to execute a method, comprising:
    acquiring a captured video from an image capturer that captures a predetermined area and at least one person;
    collecting biological information of the captured person included in the captured video from a wearable device worn by the captured person and collects peripheral environment information from a mobile terminal carried by the captured person;
    recognizing a personal status of the captured person based on the captured video and the biological information of the captured person;
    recognizing an environmental status of the predetermined area, based on the personal status of the captured person and the peripheral environment information includes at least one of a temperature, a humidity, a seismic intensity, a magnitude of noise, an illuminance, and a luminance; and displaying the recognized personal status and the recognized environmental status.

10. The non-transitory computer readable medium according to claim 9, wherein the personal status includes at least a feeling of the captured person.

\* \* \* \* \*